(12) United States Patent
Uki et al.

(10) Patent No.: US 11,465,573 B2
(45) Date of Patent: Oct. 11, 2022

(54) ELECTRIC WIRE FIXING STRUCTURE AND WIRE HARNESS

(71) Applicant: Yazaki Corporation, Tokyo (JP)

(72) Inventors: Kazutaka Uki, Shizuoka (JP); Jumpei Kato, Tochigi (JP); Yukihiro Kawamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 17/514,146

(22) Filed: Oct. 29, 2021

(65) Prior Publication Data

US 2022/0134976 A1    May 5, 2022

(30) Foreign Application Priority Data

Nov. 2, 2020  (JP) .............................. JP2020-183393

(51) Int. Cl.
| | | |
|---|---|---|
| *H01R 11/11* | (2006.01) | |
| *H02G 3/04* | (2006.01) | |
| *B60R 16/02* | (2006.01) | |

(52) U.S. Cl.
CPC .......... *B60R 16/0215* (2013.01); *H01R 11/11* (2013.01); *H02G 3/04* (2013.01)

(58) Field of Classification Search
CPC ........ B60R 16/0215; H01R 11/11; H02G 3/04
USPC ...................................... 174/72 A
See application file for complete search history.

(56) References Cited

U.S. PATENT DOCUMENTS

| | | | |
|---|---|---|---|
| 1,217,398 A | | 2/1917 | Bonneli |
| 4,454,381 A | * | 6/1984 | Ito ........................... H02G 3/088 174/650 |
| 2005/0045361 A1 | * | 3/2005 | Arai .................... B60R 16/0215 174/72 A |
| 2008/0142260 A1 | * | 6/2008 | Yamaguchi .......... B60N 2/0224 174/72 A |
| 2012/0100753 A1 | * | 4/2012 | Omae .................. H01R 13/648 439/588 |
| 2014/0374134 A1 | | 12/2014 | Itani et al. |
| 2016/0099529 A1 | * | 4/2016 | Okamoto ............. H01R 13/748 439/578 |
| 2016/0248235 A1 | * | 8/2016 | Itou ..................... B60R 16/0215 |

(Continued)

FOREIGN PATENT DOCUMENTS

| | | |
|---|---|---|
| DE | 3907078 A1 | 9/1990 |
| DE | 112012005463 T5 | 9/2014 |

(Continued)

*Primary Examiner* — Timothy J Thompson
*Assistant Examiner* — Michael F McAllister
(74) *Attorney, Agent, or Firm* — Banner & Witcoff, Ltd.

(57) ABSTRACT

An electric wire fixing structure includes a metal protector that houses a protection target part of an electric wire in an electric wire housing chamber on an inner side and allows the electric wire in the electric wire housing chamber to be led out from an electric wire outlet of the electric wire housing chamber; and a fastening structure that fixes the protector to a metal fastening target. The fastening structure includes a male screw member, a through-hole formed in the protector and through which the male screw member is inserted, and a female screw part provided in the fastening target and in which the male screw member is screwed. At least a part of the protector is abutted against the fastening target when the protector is fixed to the fastening target.

9 Claims, 5 Drawing Sheets

(56) References Cited

U.S. PATENT DOCUMENTS

2018/0269624 A1* 9/2018 Iwabe ................ H01R 13/6215
2021/0229607 A1 7/2021 Fujimura et al.

FOREIGN PATENT DOCUMENTS

| DE | 202017000417 U1 | 2/2017 |
| JP | 2006-074843 A | 3/2006 |
| WO | 2019/239862 A1 | 12/2019 |

* cited by examiner

ELECTRIC WIRE FIXING STRUCTURE AND WIRE HARNESS

CROSS-REFERENCE TO RELATED APPLICATION(S)

The present application claims priority to and incorporates by reference the entire contents of Japanese Patent Application No. 2020-183393 filed in Japan on Nov. 2, 2020.

BACKGROUND OF THE INVENTION

1. Field of the Invention

The present invention relates to an electric wire fixing structure and a wire harness.

2. Description of the Related Art

Conventionally, a wire harness may be provided with an electric wire protection member for protecting electric wires placed in an installation target such as a vehicle. For example, known electric wire protection members include a protection member (a protector, a corrugated tube, or the like) that covers electric wires by housing them on the inner side thereof, a protection member (a clip, a clamp, or the like) that fixes electric wires to a peripheral component of a car body or the like to prevent interference between the electric wires and the peripheral component, and the like. Furthermore, it is also possible to have the protector also bear a function of preventing interference between the electric wires and the peripheral component by fixing it to the peripheral component. As for the wire harness, a protector or a corrugated tube may be used for protection, the protector and the corrugated tube may both be used for protection, or a clip or the like may be used for protection depending on the electric wire routing paths and the peripheral components. For example, Japanese Patent Application Laid-open No. 2006-74843 discloses a technique for protecting electric wires with a protector.

Incidentally, a higher current is becoming more required for a vehicle due to the use of an electric motor for the drive source, and the like. Therefore, there is a large amount of heat generated in the electric wires in the wire harness, so that it is desired to increase the heat dissipation property thereof. However, since the protector and the corrugated tube are molded of a synthetic resin material exhibiting low thermal conductivity, it is difficult for the heat in the inner space thereof to escape. Therefore, there is still room for improvement in terms of the heat dissipation property of the electric wires. In the meantime, while the clip and the clamp are also molded of a synthetic resin material exhibiting low thermal conductivity, the volume thereof covering the electric wires is smaller than that of the protector and the like. Therefore, the clip and the clamp are advantageous in terms of the heat dissipation property of the electric wires. However, from the viewpoint of the original purpose to protect the electric wires, the clip and the like may be limited in the applicable scope thereof depending on the surrounding environment.

SUMMARY OF THE INVENTION

It is therefore an object of the present invention to provide an electric wire fixing structure and a wire harness capable of protecting electric wires with an excellent heat dissipation property.

In order to achieve the above mentioned object, an electric wire fixing structure according to one aspect of the present invention includes a metal protector that houses a protection target part of an electric wire in an electric wire housing chamber on an inner side and allows the electric wire in the electric wire housing chamber to be led out from an electric wire outlet of the electric wire housing chamber; and a fastening structure that fixes the protector to a metal fastening target, wherein the fastening structure includes a male screw member, a through-hole formed in the protector and through which the male screw member is inserted, and a female screw part provided in the fastening target and in which the male screw member is screwed, or includes a male screw member erected on the fastening target, a through-hole formed in the protector and through which the male screw member is inserted, and a female screw member that is screwed on the male screw member, and at least a part of the protector is abutted against the fastening target when the protector is fixed to the fastening target.

According to another aspect of the present invention, in the electric wire fixing structure, it is preferable that the protector includes a first housing member that includes an electric wire housing groove serving as the electric wire housing chamber, and a second housing member that is fitted on the first housing member and closes an opening of the electric wire housing groove.

According to still another aspect of the present invention, in the electric wire fixing structure, it is preferable that the protector has a protrusion part to be abutted against the fastening target, and the through-hole is formed in the protrusion part.

According to still another aspect of the present invention, in the electric wire fixing structure, it is preferable to further includes a tubular electric wire protection member that houses and covers the electric wire on an inner side, wherein in the electric wire housing chamber, the electric wire protection member is housed only in an electric wire lead-out part at at least one end having the electric wire outlet.

In order to achieve the above mentioned object, a wire harness according to still another aspect of the present invention includes an electric wire; a metal protector that houses a protection target part of the electric wire in an electric wire housing chamber on an inner side and allows the electric wire in the electric wire housing chamber to be led out from an electric wire outlet of the electric wire housing chamber; and a fastening structure that fixes the protector to a metal fastening target, wherein the fastening structure includes a male screw member, a through-hole formed in the protector and through which the male screw member is inserted, and a female screw part provided in the fastening target and in which the male screw member is screwed, or includes a male screw member erected on the fastening target, a through-hole formed in the protector and through which the male screw member is inserted, and a female screw member that is screwed on the male screw member, and at least a part of the protector is abutted against the fastening target when the protector is fixed to the fastening target.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Hereinafter, an embodiment of an electric wire fixing structure and a wire harness according to the present invention will be described in detail with reference to the accompanying drawings. It is to be noted that the present invention is not limited by the present embodiment.

Embodiment

One of embodiments of the electric wire fixing structure and the wire harness according to the present invention will be described by referring to FIG. 1 to FIG. 5.

Figure 1:
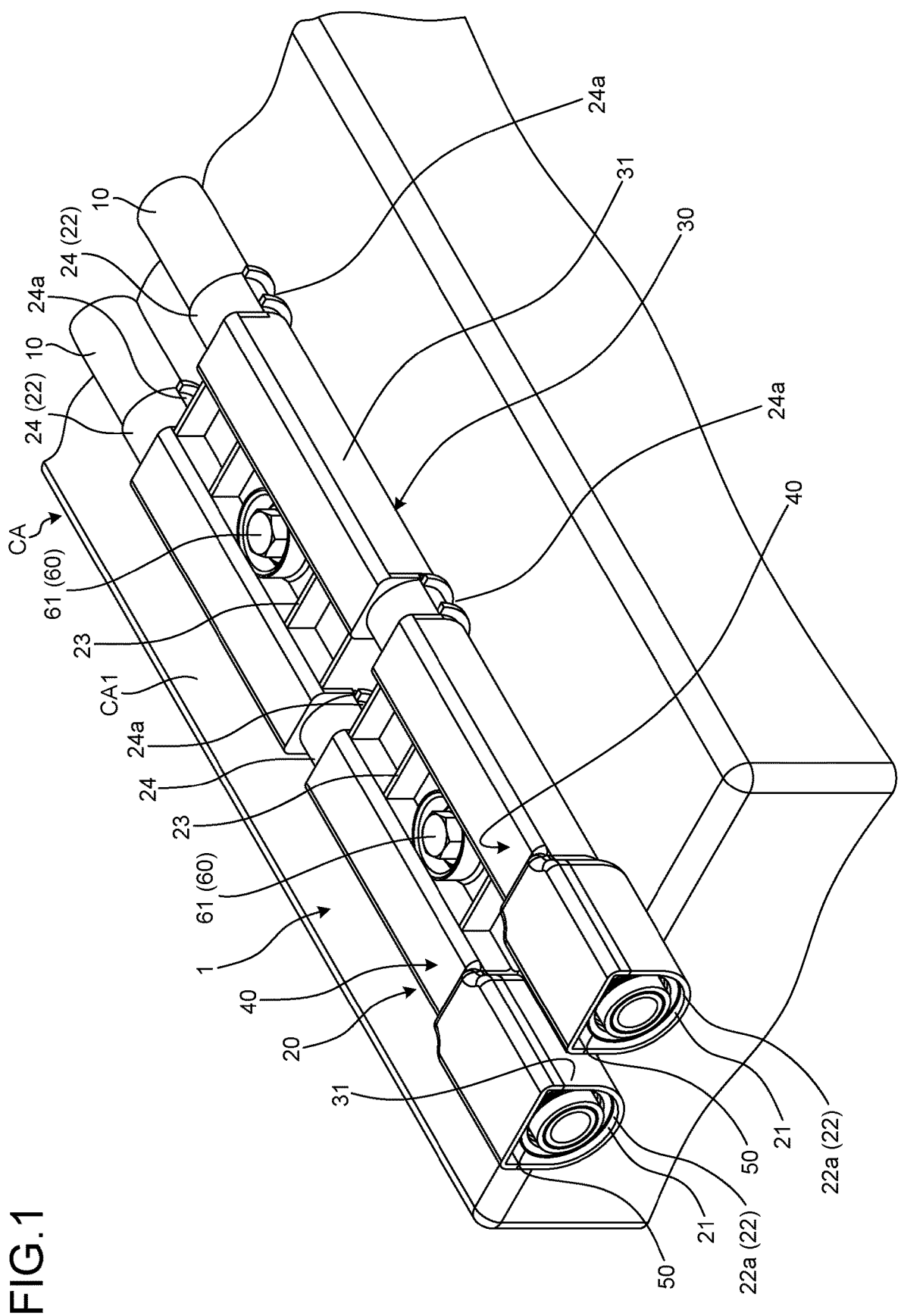
FIG. 1 is a perspective view illustrating a wire harness according to an embodiment.
Figure 2:
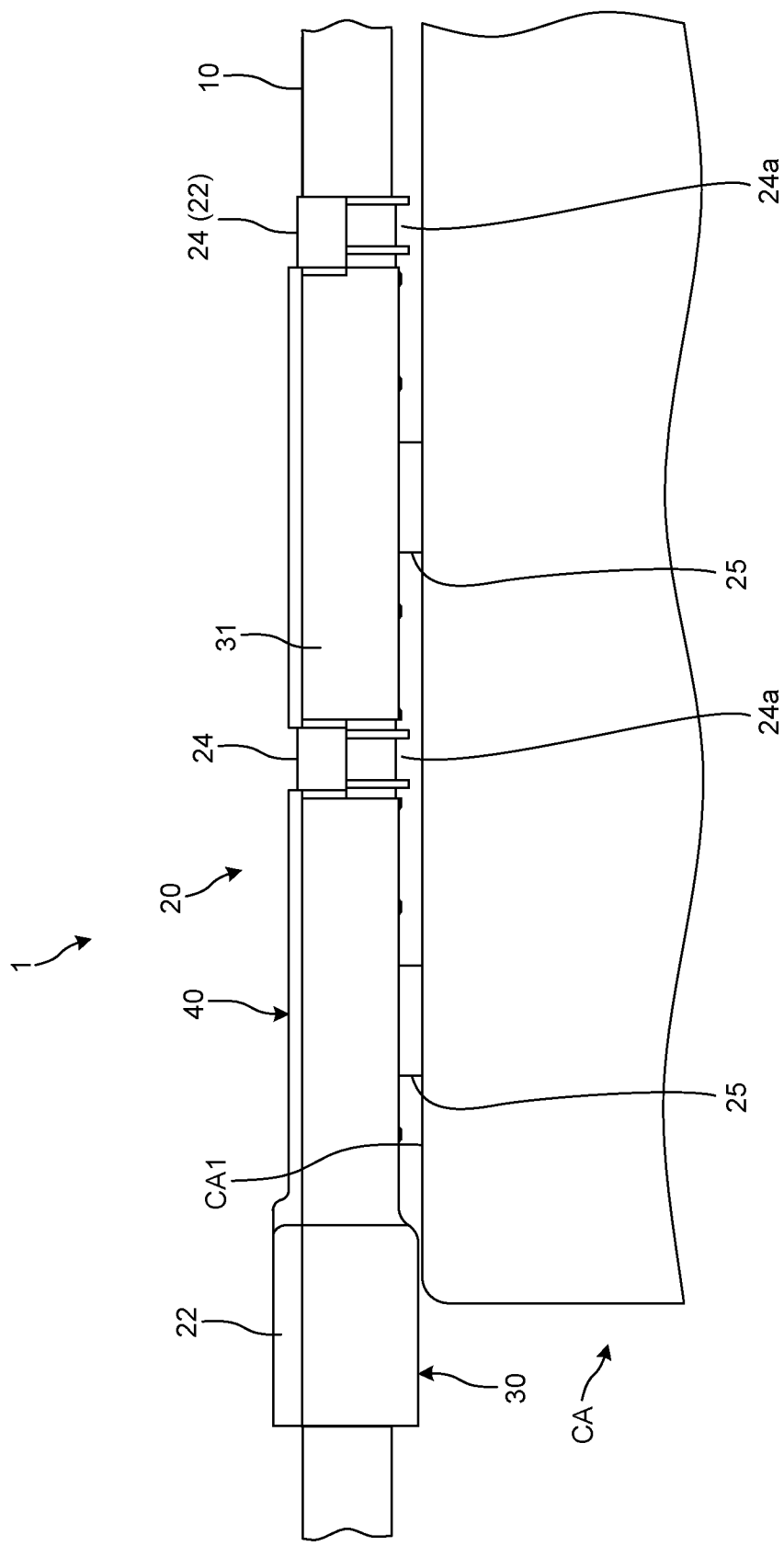
FIG. 2 is a side view of the wire harness according to the present embodiment viewed from a side.
Figure 3:
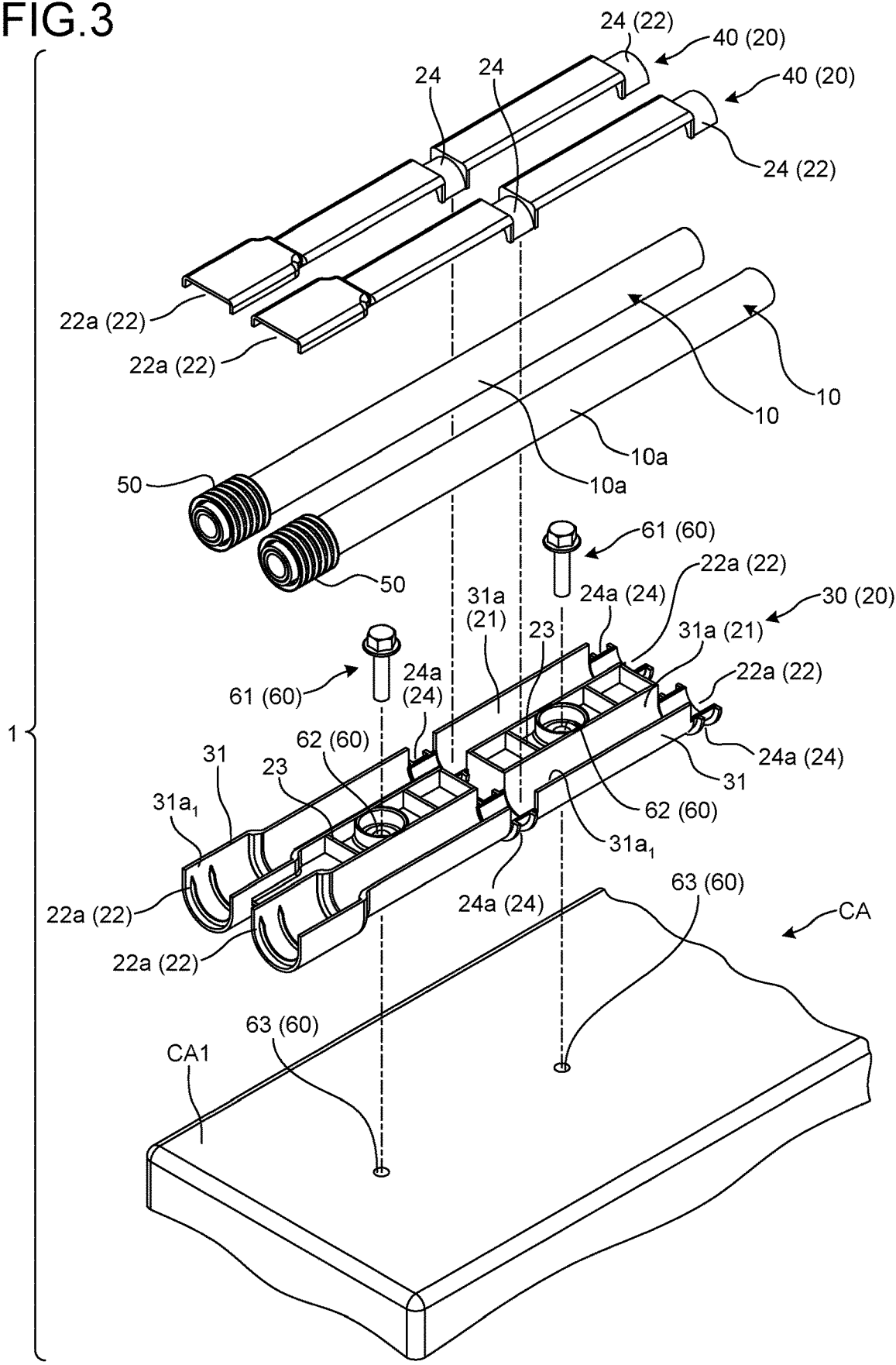
FIG. 3 is an exploded perspective view illustrating a fixing structure and the wire harness according to the present embodiment.

Reference numeral 1 in FIG. 1 to FIG. 3 indicates the wire harness of the present embodiment. The wire harness 1 includes electric wires 10 and an electric wire fixing structure for fixing the electric wires 10 to a fastening target CA.

Although not illustrated, each of the electric wires 10 has one end electrically connected to a drive unit of a vehicle and the other end electrically connected to a secondary battery of the vehicle, for example. The drive unit includes an electric motor as a drive source in a vehicle such as an electric vehicle, an inverter, and the like. Therefore, the electric wire 10 is used for supplying power to the drive unit from the secondary battery, for charging regenerative power generated on the drive unit side to the secondary battery, and the like. In this example, a metal casing of the drive unit is used as a fastening target CA.

The electric wire fixing structure and the wire harness 1 according to the present embodiment include a metal protector 20 that houses a protection target part 10a of the electric wire 10 to protect it from peripheral components (not illustrated), and fix the electric wire 10 to the fastening target CA via the protector 20 (FIG. 1 to FIG. 3).

Figure 4:
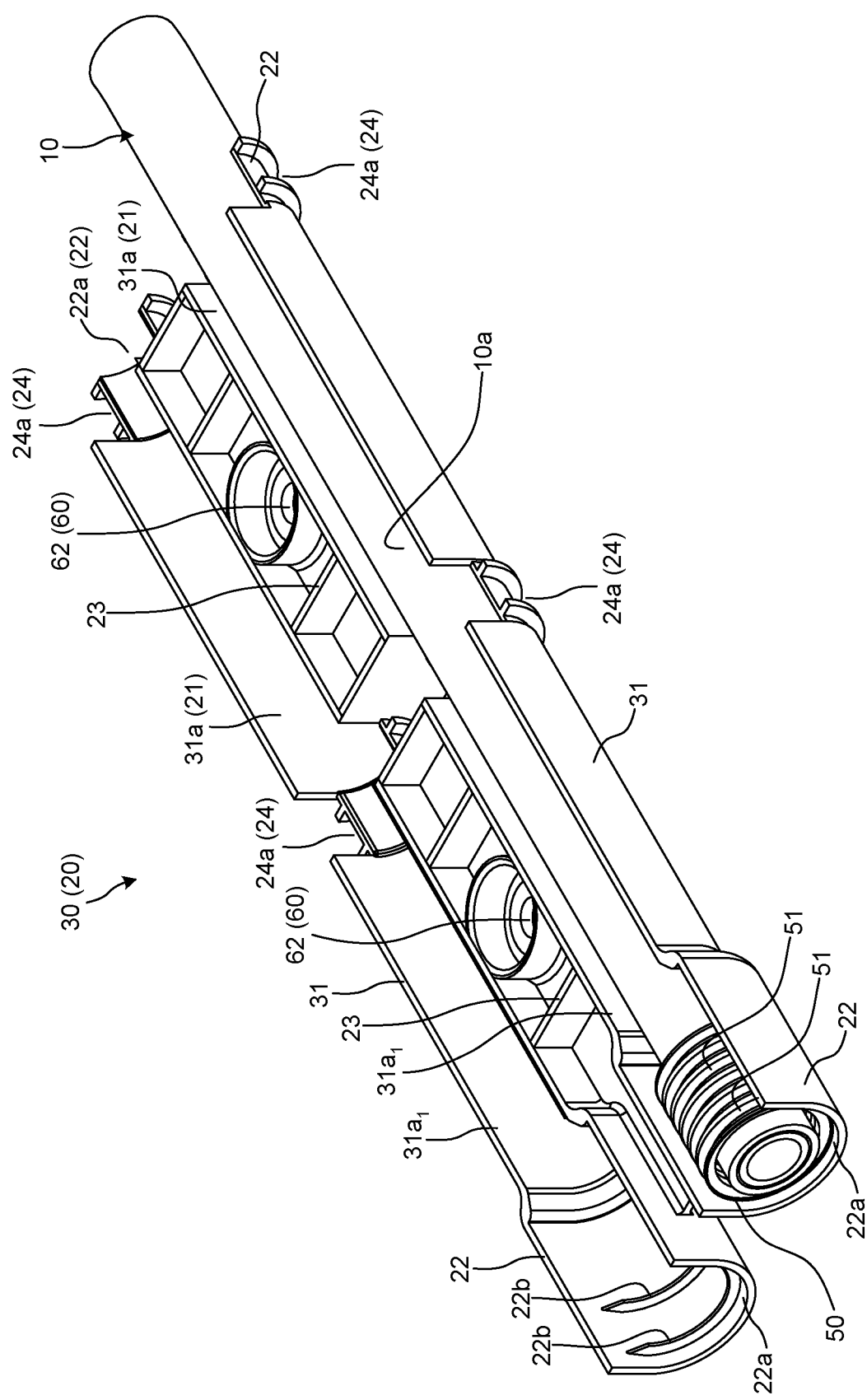
FIG. 4 is a perspective view for describing a housing state of an electric wire with respect to a first housing member.

As for the protector 20, an electric wire housing chamber 21 for housing the protection target part 10a of the electric wire 10 is formed on the inner side thereof (FIG. 1, FIG. 2, and FIG. 4). Furthermore, as for the protector 20, the electric wire 10 in the electric wire housing chamber 21 is led out to an outer side from an electric wire lead-out part 22 at an end part of the electric wire housing chamber 21 (FIG. 1, FIG. 3, and FIG. 4). Therefore, the electric wire lead-out part 22 includes an electric wire outlet 22a for leading out the electric wire 10 in the electric wire housing chamber 21 to the outer side, which is an opening at the end on an electric wire routing path of the electric wire housing chamber 21 (FIG. 1).

The protector 20 discussed herein is for protecting each of the protection target parts 10a of a plurality of the electric wires 10, and the electric wire housing chamber 21 is provided for each of the electric wires 10 (FIG. 1 and FIG. 3). In this example, two electric wire housing chambers 21 are formed. Furthermore, each of the electric wire housing chambers 21 discussed herein has a space formed in a columnar shape with a diameter larger than that of the columnar electric wire 10, and allows the electric wire 10 to be routed along the axis of the space. Furthermore, at each of both ends of the electric wire housing chamber 21 discussed herein, the electric wire lead-out part 22 having the electric wire outlet 22a is provided (FIG. 4). Furthermore, the electric wire housing chambers 21 are provided in parallel with each other along the axis of the columnar space with a space provided therebetween. The protector 20 includes connection parts 23 for connecting the neighboring electric wire housing chambers 21 (FIG. 1, FIG. 3, and FIG. 4).

The protector 20 includes: a first housing member 30 in which electric wire housing grooves 31a serving as the electric wire housing chambers 21 are formed; and second housing members 40 that are fitted on the first housing member 30 and closes respective openings $31a_1$ of the electric wire housing grooves 31a (FIG. 1 to FIG. 3). The first housing member 30 and the second housing members 40 are molded by die casting (including a cutting process for a die-casting molded article), or shaped by press molding a metal plate as a base material, for example.

The first housing member 30 includes housing bodies 31 each formed in a gutter shape for one electric wire 10, and the groove-like space of each housing body 31 is used as one electric wire housing groove 31a (FIG. 3 and FIG. 4). The electric wire housing groove 31a discussed herein forms the main space of each electric wire housing chamber 21. Furthermore, in the first housing member 30, openings at both ends of the electric wire housing groove 31a are used as a part of the electric wire outlets 22a (FIG. 3). Furthermore, in the first housing member 30, each opening $31a_1$ disposed opposing to the bottom of the electric wire housing groove 31a of the housing body 31 is used as an insertion port when housing the electric wire 10.

In the first housing member 30, the neighboring housing bodies 31 are connected by the above-described connection parts 23 (FIG. 3 and FIG. 4). In this example, two connection parts 23 are provided between two housing bodies 31.

The second housing members 40 may be configured to collectively close all of the openings $31a_1$ provided in the first housing member 30 or may be configured to close the respective openings $31a_1$. Each of the second housing members 40 discussed herein is molded in a plate-like shape corresponding to the shape of the opening $31a_1$, and fitted on the corresponding housing body 31 to close the opening $31a_1$ of the housing body 31 (FIG. 1 and FIG. 3). Furthermore, both ends of the second housing member 40 discussed herein are formed in a gutter shape, and the openings at both ends are used as a part of the electric wire outlets 22a (FIG. 3). Note that the openings on one end side alone are indicated in the drawing and the openings on the other end side are omitted.

The protector 20 may be configured to fix the first housing member 30 and each second housing member 40 in the fitted state by a lock mechanism or may be configured to fix those in the fitted state by using another fixing member. Although not illustrated, the lock mechanism is configured to fix the first housing member 30 and the second housing member 40 in the fitted state by hooking a claw part provided to at least one of the first housing member 30 and the second housing member 40 to the other one, for example. Furthermore, an example of another fixing member may be a tying band wound around the first housing member 30 and the second housing member 40 in the fitted state from the outer side. Furthermore, the protector 20 may be configured to co-fasten the first housing member 30 and the second housing members 40 to the fastening target CA by having, instead of the fixing structures, a connection part for connecting the second housing members 40 and a through-hole formed in the connection part concentrically with a through-hole 62 to be described later and by inserting a male screw member 61 to be described later also through that through-hole. That is, the protector 20 may fix the first housing member 30 and the second housing members 40 by using a fastening structure 60 to be described later.

As for the protector 20 discussed herein, a cylindrical part 24 is formed by each housing body 31 and the corresponding second housing member 40 in a fitted state at a part of the fitted housing body 31 and second housing member 40 (FIG. 1 and FIG. 2). In the protector 20, an arc-shape groove on the outer peripheral face side of the cylindrical part 24 is used as a fixing groove 24a used for positioning when winding a tying band (not illustrated) (FIG. 1 and FIG. 2). The tying band may be attached in advance to the housing body 31 or may be attached after fitting the housing body 31 and the second housing member 40 together. In the protector 20 discussed herein, the cylindrical part 24 is formed by combining semicircular arc shaped gutter parts respectively provided to the housing body 31 of the first housing member 30 and the second housing member 40 (FIG. 1 and FIG. 3). Furthermore, the fixing groove 24a discussed herein is provided to the semicircular arc shaped gutter part of the first housing member 30 (FIG. 3). As for the protector 20 discussed herein, the cylindrical part 24 having the fixing groove 24a is formed at one end and the intermediate part of the fitted body of the housing body 31 and the second housing member 40. In the protector 20, the cylindrical part 24 at the one end is also used as one of the electric wire lead-out parts 22.

Furthermore, the electric wire fixing structure and the wire harness 1 include tubular electric wire protection members 50 that each house and cover the electric wire 10 on the inner side thereof (FIG. 1, FIG. 3, and FIG. 4). The electric wire protection member 50 discussed herein is a cylindrical corrugated tube molded of a synthetic resin material, and a plurality of annular concentric grooves 51 are arranged on the outer peripheral face thereof with a space provided therebetween along the axial direction of the tube (FIG. 4). In each electric wire housing chamber 21, the electric wire protection member 50 is housed only in the electric wire lead-out part 22 at least one end. That is, the electric wire protection member 50 may be disposed only in one of the electric wire lead-out parts 22 at both ends of the electric wire housing chamber 21 or may be disposed in each of the electric wire lead-out parts 22 at both ends.

In the electric wire fixing structure and the wire harness 1 discussed herein, the inner diameter of each electric wire lead-out part 22 at one end (cylindrical part 24) is formed to be equivalent to the diameter of the electric wire 10, and the electric wire protection member 50 is not housed in this electric wire lead-out part 22 but is housed only in the electric wire lead-out part 22 at the other end. Thus, an arc shaped fitting protrusion 22b fitted into the grooves 51 of the electric wire protection member 50 is formed on the inner wall face of the electric wire lead-out part 22 on the other end (FIG. 4). Note here that two fitting protrusions 22b are formed on the inner wall face of the electric wire lead-out part 22 on the other end.

Note here that the electric wire protection member 50 may be molded in a length to be positioned only in the electric wire lead-out part 22 or may be molded in a length to protrude from the electric wire outlet 22a to a protection target position of the electric wire 10 in order to protect the electric wire 10 led out from the electric wire outlet 22a.

Furthermore, the electric wire fixing structure and the wire harness 1 include the fastening structure 60 for fixing the protector 20 to the metal fastening target CA (FIG. 3). As described above, the fastening target CA discussed herein as an example is a metal casing. Thus, the fastening structure 60 is configured to be able to fix the protector 20 to an outer wall face CA1 of the casing (FIG. 1 to FIG. 3). Furthermore, the fastening structure 60 uses a fastening member to fix the protector 20 to the fastening target CA. The fastening member is a screw member. As the fastening structure 60, one of the following two forms using the screw member is applied.

The fastening structure 60 includes a male screw member, a through-hole formed in the protector 20 through which the male screw member is inserted, and a female screw part provided to the fastening target CA and in which the male screw member is screwed, or includes a male screw member erected on the fastening target CA, a through-hole formed in the protector 20 and through which the male screw member is inserted, and a female screw member that is screwed on the male screw member. In this example, the fastening structure 60 of the former form is applied. Thus, the fastening structure 60 discussed herein includes the male screw member 61, the through-hole 62 formed in the protector 20 and through which the male screw member 61 is inserted, and a female screw part 63 provided in the fastening target CA and in which the male screw member 61 is screwed (FIG. 3). The fastening structure 60 includes at least two sets of the male screw member 61, the through-hole 62, and the female screw part 63 in combination. The fastening structure 60 discussed herein includes two sets of the combination.

The protector 20 is fixed to the fastening target CA by fixing the first housing member 30 to the fastening target CA. Thus, the through-holes 62 are formed in the first housing member 30. In the first housing member 30 discussed herein, the through-holes 62 are formed in the connection part 23. Furthermore, in the first housing member 30, the through-holes 62 may be formed in the respective connection parts 23 or a plurality of the through-holes 62 may be provided to in one of the connection parts 23. In this example, one circular through-hole 62 is formed in each of the connection parts 23.

In the casing as the fastening target CA discussed herein, at least the outer wall face CA1 where the protector 20 is fixed is formed flat. The female screw parts 63 may be formed not to protrude from the outer wall face CA1 of the fastening target CA or may be formed in a protrusion part that protrudes from the outer wall face CA1 of the fastening target CA. In this example, the female screw parts 63 are formed not to protrude from the outer wall face CA1 of the fastening target CA as in the former case.

When being fixed to the fastening target CA, the protector 20 has at least a part thereof abutted against the fastening target CA. That is, the fastening structure 60 is configured to fix the protector 20 to the fastening target CA in a state where at least a part of the protector 20 is abutted against the fastening target CA. Thereby, the protector 20 can transmit the heat thereof to the fastening target CA via the contact part when the temperature of the protector 20 itself is increased to be higher than that of the fastening target CA.

For example, when the protector 20 is fixed to the fastening target CA, at least one selected from the housing bodies 31 of the first housing member 30 and the connection parts 23 is abutted against the fastening target CA. Thereby, the protector 20 can have a wide contact area with the fastening target CA, so that the heat of the protector 20 itself can be easily transferred to the fastening target CA.

However, the protector 20 discussed herein has a protrusion part 25 to be abutted against the fastening target CA so as to be able to suppress deterioration in the durability of the protector 20 itself and the fastening target CA even when vehicle running vibration is input, or thermal expansion or thermal contraction occurs (FIG. 2). That is, the protector 20 discussed herein is formed to be abutted against the fastening target CA only via the protrusion part 25. When the protrusion part 25 is provided to each of the housing bodies 31, the protrusion parts 25 may protrude from the outer wall faces of the respective housing bodies 31. Furthermore, the protrusion part 25 may protrude from the connection part 23. Moreover, the protrusion part 25 may be formed as a part of the first housing member 30, or may be molded as a separate member from the first housing member 30 and attached to the first housing member 30. In this example, the cylindrical protrusion parts 25 formed as a part of the first housing members 30 protrude from the respective connection parts 23, and one of the annular end faces of each protrusion part 25 is brought in contact with the outer wall face CA1 of the fastening target CA. Furthermore, the inner space of the protrusion part 25 is used herein as the through-hole 62 through which the male screw member 61 is inserted. That is, the through-hole 62 is formed in the protrusion part 25.

In the wire harness 1 configured in the manner described above, first, the first housing member 30 is placed on the outer wall face CA1 of the fastening target CA, and the male screw members 61 are inserted through the through-holes 62 and screwed into the female screw parts 63 in the outer wall face CA1 of the fastening target CA to fix the first housing member 30 to the fastening target CA. Then, in the wire harness 1, the protection target part 10a of the electric wire 10 on which the electric wire protection member 50 is mounted is placed in the electric wire housing groove 31a of each of the housing bodies 31 of the first housing member 30. When placing the protection target part 10a, the grooves 51 of the electric wire protection member 50 are fitted with the fitting protrusions 22b on the inner wall face of the corresponding electric wire lead-out part 22. Subsequently, in the wire harness 1, the second housing member 40 is fitted on each of the housing bodies 31 of the first housing member 30, forming the cylindrical part 24, and a tying band is wound around the fixing groove 24a of the cylindrical part 24 so as to fix the second housing member 40 to the housing body 31.

In the electric wire fixing structure and the wire harness 1 of the present embodiment, the heat of the electric wire 10 generated by energization is transferred from the protection target part 10a to the protector 20 directly or indirectly. The heat of the protector 20 is also transferred to the fastening target CA when the temperature of the protector 20 itself is higher than that of the outer wall face CA1 of the fastening target CA. In this example, the heat of the protector 20 is transferred to the outer wall face CA1 of the fastening target CA via the protrusion parts 25. Furthermore, the heat of the protector 20 is transferred to the male screw members 61, and transferred to the fastening target CA from the male screw members 61 via the female screw parts 63. In this example, the heat of the protector 20 is transferred to the male screw members 61 mainly via the protrusion parts 25. Moreover, the heat of the protector 20 is released to the ambient air when the temperature of the protector 20 itself is higher than the ambient atmospheric temperature. Therefore, the electric wire fixing structure and the wire harness 1 of the present embodiment is capable of achieving protection of the electric wire 10 with an excellent heat dissipation property by the use of the protector 20 and the fastening structure 60.

Furthermore, in the electric wire fixing structure and the wire harness 1 of the present embodiment, the electric wire protection member 50 is disposed only in the electric wire lead-out part 22 in each of the electric wire housing chambers 21. Thus, in the protection target part 10a of the electric wire 10 in the electric wire housing chamber 21, there is an exposed part that is not covered by the electric wire protection member 50. Therefore, as for the protection target part 10a, the heat can be dissipated to the air within the chamber from the exposed part that is not covered by the electric wire protection member 50 in the electric wire housing chamber 21 or can be transferred to the protector 20 from the exposed part. As a result, the electric wire fixing structure and the wire harness 1 of the present embodiment is considered to be capable of achieving protection of the electric wire 10 with an excellent heat dissipation property in this regard as well.

Figure 5:
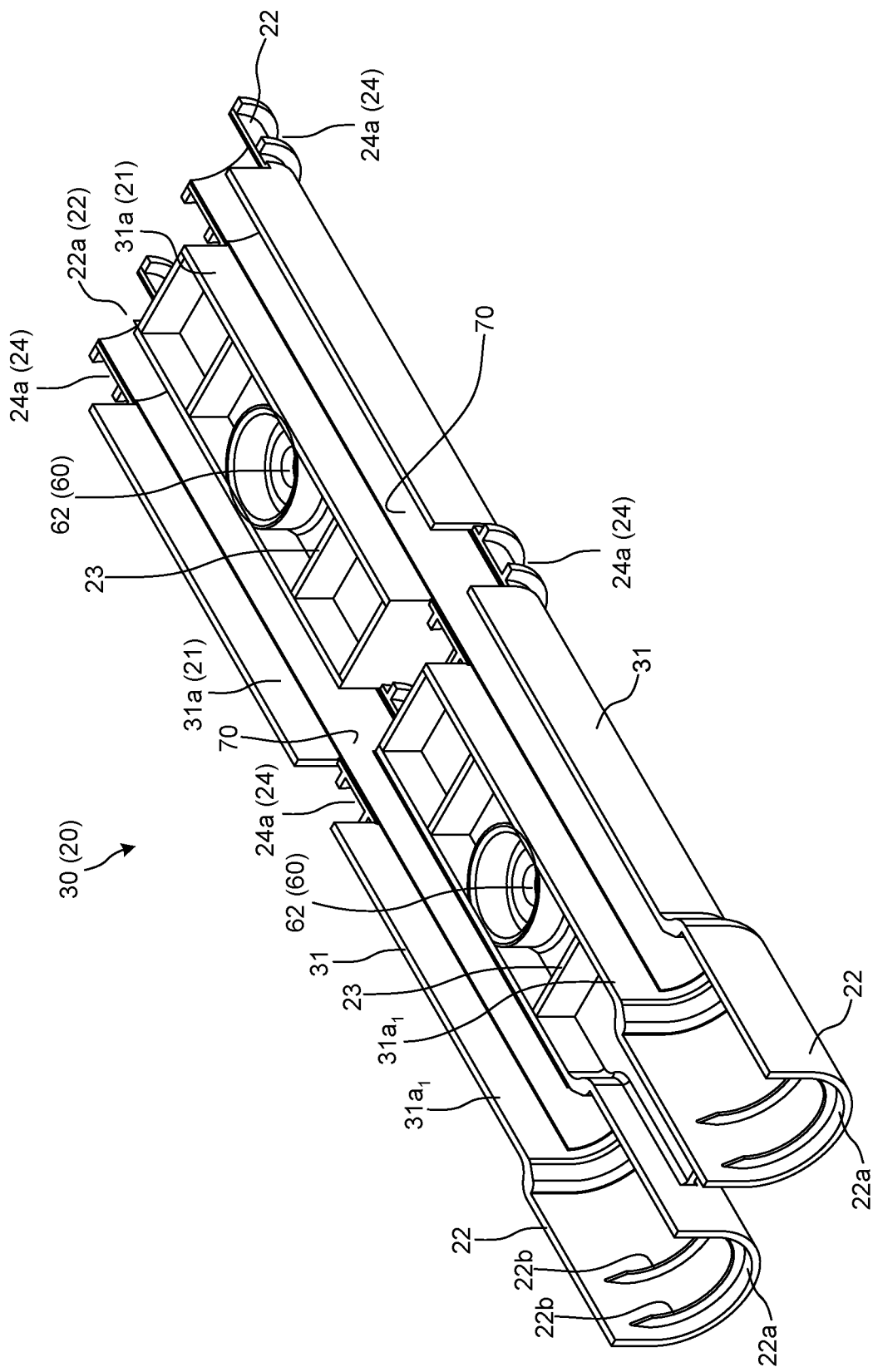
FIG. 5 is a perspective view illustrating an example of a heat transfer member.

Note here that the electric wire fixing structure and the wire harness 1 may include, in the electric wire housing chamber 21, a heat transfer member 70 for transferring the heat of the electric wire 10 to the inner wall of the electric wire housing chamber 21 (FIG. 5). For example, as the heat transfer member 70, a member exhibiting higher thermal conductivity than the sheath of the electric wire 10 does is used. Thereby, the heat of the electric wire 10 can be easily transferred to the protector 20, and thus the electric wire fixing structure and the wire harness 1 of the present embodiment are able to achieve protection of the electric wire 10 with an excellent heat dissipation property.

The heat transfer member 70 may be attached in advance to the outer peripheral face of the electric wire 10 or may be attached to the inner wall of the electric wire housing chamber 21. The heat transfer member 70 discussed herein is a heat transfer sheet in a sheet form exhibiting flexibility, and it is attached to the inner wall of the electric wire housing groove 31a of each of the housing bodies 31 of the first housing member 30 to fit along the shape of the inner wall. The heat transfer member 70 is pasted in advance on the inner wall of the electric wire housing groove 31a using an adhesive or the like, for example. Furthermore, as for the heat transfer member 70, it is desirable for its sheet faces to be in contact with the inner wall of the electric wire housing groove 31a and the outer peripheral face of the electric wire 10, respectively, in order to easily transfer the heat of the electric wire 10 to the inner wall of the electric wire housing chamber 21. The heat transfer member 70 of this example is placed on a part of the inner wall of the electric wire housing groove 31a where the electric wire protection member 50 is not disposed. That is, the heat transfer member 70 of this example is provided in order to transfer the heat of the exposed part not covered by the electric wire protection member 50 in the protection target part 10a of the electric wire 10 to the inner wall of the electric wire housing chamber 21.

Although not illustrated, the heat transfer member 70 may also be placed on the inner wall of the second housing member 40 so as to further improve the heat dissipation property of the electric wire 10 by transferring the heat of the electric wire 10 also to the inner wall of the second housing member 40.

Furthermore, in the electric wire fixing structure and the wire harness 1 of the present embodiment, the thickness of the protector 20 (the first housing member 30, the second housing members 40) can be reduced by using a metal plate as the base material, for example. Specifically, the protector 20 can be formed thin while improving the strength thereof compared to a protector molded of a synthetic resin material as in the conventional cases. Therefore, compared to the conventional protectors formed of a synthetic resin material, the protector 20 in the electric wire fixing structure and the wire harness 1 can be made small and also be lightened depending on the metal material and the thickness thereof.

Moreover, the protector 20 is abutted against the fastening target CA via the protrusion parts 25 in the electric wire fixing structure and the wire harness 1 of the present embodiment, so that the contact area between the protector 20 and the fastening target CA is smaller than that in the case where at least one selected from the housing bodies 31 and the connection parts 23 is abutted against the fastening target CA. Therefore, the electric wire fixing structure and the wire harness 1 are capable of suppressing deterioration in the durability of the protector 20 and the fastening target CA even when vehicle running vibration is input, or thermal expansion or thermal contraction occurs.

Moreover, the electric wire fixing structure and the wire harness 1 of the present embodiment can be fixed to the fastening target CA with the simple fitting process described above as an example.

In the electric wire fixing structure and the wire harness according to the present embodiment, the heat generated by energization is transferred from the protection target part to the protector directly or indirectly. The heat of the protector is also transferred to the fastening target when the temperature of the protector itself is higher than that of the fastening target. Furthermore, the heat of the protector is transferred to the male screw member, and transferred to the fastening target from the male screw member via the female screw part. Moreover, the heat of the protector is released to the ambient air when the temperature of the protector itself is higher than the ambient atmospheric temperature. Therefore, the electric wire fixing structure and the wire harness according to the present embodiment is capable of achieving protection of the electric wire with an excellent heat dissipation property by the use of the protector and the fastening structure.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric wire fixing structure comprising:
   a metal protector that houses a protection target part of an electric wire in an electric wire housing chamber on an inner side and allows the electric wire in the electric wire housing chamber to be led out from an electric wire outlet of the electric wire housing chamber; and
   a fastening structure that fixes the protector to a metal fastening target, wherein
   the fastening structure includes a male screw member, a through-hole formed in the protector and through which the male screw member is inserted, and a female screw part provided in the fastening target and in which the male screw member is screwed, or includes a male screw member erected on the fastening target, a through-hole formed in the protector and through which the male screw member is inserted, and a female screw member that is screwed on the male screw member, and
   at least a part of the protector is abutted against the fastening target when the protector is fixed to the fastening target.

2. The electric wire fixing structure according to claim 1, wherein
   the protector includes a first housing member that includes an electric wire housing groove serving as the electric wire housing chamber, and a second housing member that is fitted on the first housing member and closes an opening of the electric wire housing groove.

3. The electric wire fixing structure according to claim 1, wherein
   the protector has a protrusion part to be abutted against the fastening target, and
   the through-hole is formed in the protrusion part.

4. The electric wire fixing structure according to claim 2, wherein
   the protector has a protrusion part to be abutted against the fastening target, and
   the through-hole is formed in the protrusion part.

5. The electric wire fixing structure according to claim 1, further comprising:
   a tubular electric wire protection member that houses and covers the electric wire on an inner side, wherein
   in the electric wire housing chamber, the electric wire protection member is housed only in an electric wire lead-out part at at least one end having the electric wire outlet.

6. The electric wire fixing structure according to claim 2, further comprising:
   a tubular electric wire protection member that houses and covers the electric wire on an inner side, wherein
   in the electric wire housing chamber, the electric wire protection member is housed only in an electric wire lead-out part at at least one end having the electric wire outlet.

7. The electric wire fixing structure according to claim 3, further comprising:
   a tubular electric wire protection member that houses and covers the electric wire on an inner side, wherein
   in the electric wire housing chamber, the electric wire protection member is housed only in an electric wire lead-out part at at least one end having the electric wire outlet.

8. The electric wire fixing structure according to claim 4, further comprising:
   a tubular electric wire protection member that houses and covers the electric wire on an inner side, wherein
   in the electric wire housing chamber, the electric wire protection member is housed only in an electric wire lead-out part at at least one end having the electric wire outlet.

9. A wire harness comprising:
   an electric wire;
   a metal protector that houses a protection target part of the electric wire in an electric wire housing chamber on an inner side and allows the electric wire in the electric wire housing chamber to be led out from an electric wire outlet of the electric wire housing chamber; and
   a fastening structure that fixes the protector to a metal fastening target, wherein
   the fastening structure includes a male screw member, a through-hole formed in the protector and through which the male screw member is inserted, and a female screw part provided in the fastening target and in which the male screw member is screwed, or includes a male screw member erected on the fastening target, a through-hole formed in the protector and through which the male screw member is inserted, and a female screw member that is screwed on the male screw member, and at least a part of the protector is abutted against the fastening target when the protector is fixed to the fastening target.

\* \* \* \* \*